No. 715,946. Patented Dec. 16, 1902.
A. M. BENNETT.
COMBINED PLUMB, LEVEL, AND SQUARE.
(Application filed Oct. 2, 1901.)
(No Model.) 2 Sheets—Sheet 1.
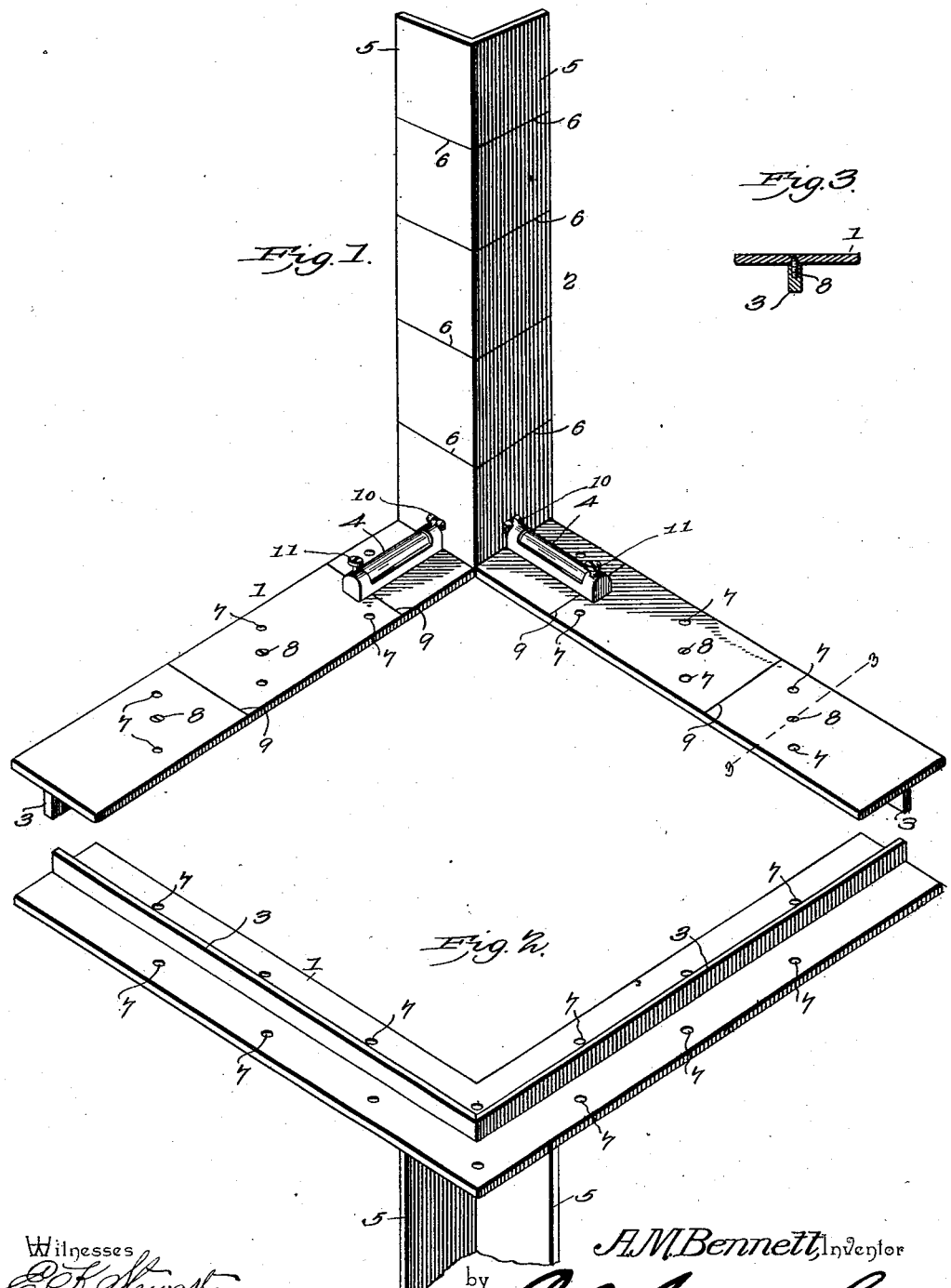

No. 715,946. Patented Dec. 16, 1902.
A. M. BENNETT.
COMBINED PLUMB, LEVEL, AND SQUARE.
(Application filed Oct. 2, 1901.)
(No Model.) 2 Sheets—Sheet 2.
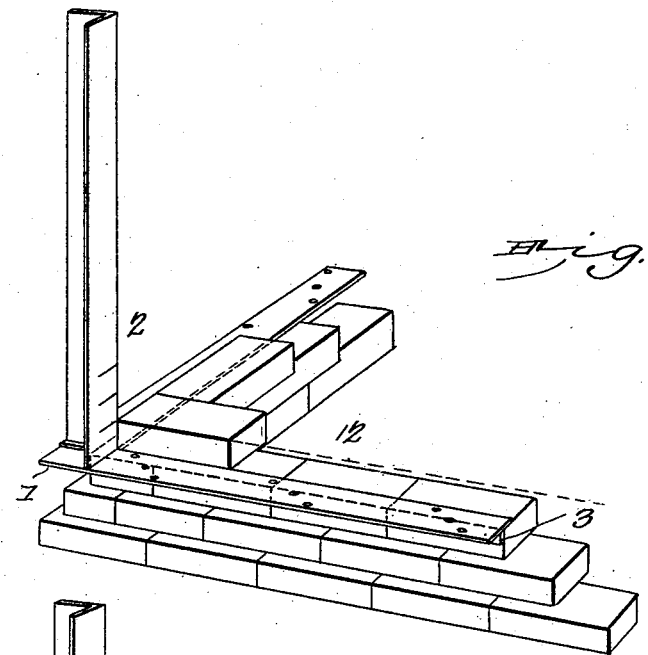
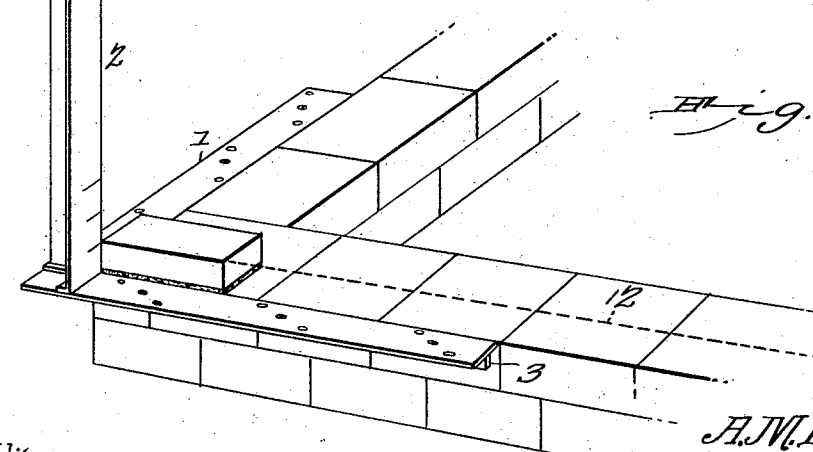

UNITED STATES PATENT OFFICE.

ALEXANDER M. BENNETT, OF CHARLEVOIX, MICHIGAN.

COMBINED PLUMB, LEVEL, AND SQUARE.

SPECIFICATION forming part of Letters Patent No. 715,946, dated December 16, 1902.

Application filed October 2, 1901. Serial No. 77,297. (No model.)

*To all whom it may concern:*

Be it known that I, ALEXANDER M. BENNETT, a citizen of the United States, residing at Charlevoix, in the county of Charlevoix and State of Michigan, have invented a new and useful Combined Plumb, Level, and Square, of which the following is a specification.

This invention relates to a combined plumb, square, and level of a character adapted more particularly for use by bricklayers.

The object is to present a tool having the above-named characteristics which shall be simple and compact in form, not liable to derangement in use, and which will with absolute accuracy operate to plumb and square work, and also to effect perfect jetting and dental and insertion work.

With these and other objects in view, as will appear as the nature of the invention is better understood, the same consists in the novel construction and combination of parts of a combined plumb, level, and square, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the scope of the invention.

In the drawings, Figure 1 is a view in perspective of the tool. Fig. 2 is a similar view inverted to show more particularly the jetting-gage associated with the square. Fig. 3 is a view in transverse section taken on the line 3 3, Fig. 1. Fig. 4 is a view in perspective exhibiting the manner in which the tool is employed for doing inside jetting-work. Fig. 5 is a similar view showing the manner in which the tool is employed in laying horizontal courses.

Referring to the drawings, 1 designates the square, 2 the plumb or standard, and 3 the jetting-gages associated with the bottom of the square.

The square 1, which by preference will be made of a single piece of metal, carries on its upper side adjacent to the plumb two spirit-levels 4, which are disposed exactly at right angles to each other and operate to determine with accuracy whether the work is level or plumb, or both.

The plumb or standard 2 is a right-angular structure with the sides 5 disposed at right angles to the length of the square members, thus throwing the hollow side to the rear of the angle of the square, and the standard is divided by graduation-marks 6, which correspond with courses in thickness or height, whereby in vertical work—such as in laying columns, pilasters, corner projections, and chimneys—the courses will be kept perfectly true, the level disposition thereof being determined by the spirit-levels 4.

The jetting-gages 3, which are associated with the under sides of the square members, may be employed either for outside or inside jetting-work, as when employed for inward-inclined jetting-work the gages will be placed against the outside of the successive courses, whereby the same may be laid exactly true, with even steps between them. For outward-inclined jetting the gages will be placed against the inside of the successive courses, with the same result as to accuracy of work. In order to adapt the gages for jetting-work of different characters—that is to say, with steps of different widths between the courses—the gages are adjustably connected with the square members, in this instance by providing the members along their length with a plurality of diagonally-disposed openings 7, through which are designed to pass screws 8, entering threaded openings in the gages 3, as shown in Fig. 3. In this instance each series or group of openings comprises three, thereby providing for three different adjustments of the gages; but it is to be understood that this number may be increased if found desirable or necessary. The manner herein shown of adjusting the gages with relation to the square members will be found effective in operation and will generally be employed; but it is to be understood that other means may be employed for the same purpose and still be within the scope of the invention. If preferred, the jetting-gages may be made rigid or integral with the square members, under which arrangement but two jetting courses may be laid with the square.

The upper surfaces of the square members are graduated or ruled, as at 9, to indicate half and whole bricks, including the mortar joint, whereby the finished work will be of uniform character throughout.

Aside from being employed for jetting purposes the square will in the usual manner be employed for squaring the corners of chimneys, walls, and the like, thereby to give proper and accurate direction to the work of each fresh course started and also for dental and insertion work. By applying either of the three edges of the plumb or standard to the work and by observing the air-bubbles in the spirit-levels plumbing of the work may be secured with accuracy.

In laying horizontal courses of bricks upon a foundation the bricklayer will set the first brick at one end of the course and bring its top surface into alinement with one of the graduation-marks on the plumb, as shown in Fig. 5, the plumb being held against the corner-brick of the foundation or that of a preceding course until the corner-brick of the freshly-started course is properly set, after which the implement is removed. The same bricklayer or another will then set a brick at the opposite end of the course, and the usual cord or line 12 (indicated by dots and dashes in Fig. 5) is then stretched between the two bricks, after which the course is laid and a second course started in like manner, and so on. In doing jetting-work—say for inward-inclined jetting-work, as shown in Fig. 4—the jetting-gage will be placed against the outside of the end brick at each corner of the course and a brick is then set up against the inner edges of the square members, the jetting-gages being adjusted to give the desired inset to the bricks, after which the cord or line is stretched between the two bricks, as above described, and the course is completed, the succeeding courses being built in the same manner. In doing outward-inclined jetting the operation is just reversed—that is to say, the jetting-gage will be placed against the inside of the successive courses, and as this will be readily understood illustration is deemed unnecessary.

It will be seen from the foregoing description that provision is made for effecting true work where the same is to be level or plumb; but to increase the range of usefulness of the tool provision is made whereby the same may be applicable for use in determining lines other than perpendicular, as in the case of building a tapering tower or chimney. To effect this, the spirit-levels are made adjustable by hinging each at one end to one of the plumb members, as at 10, and providing the opposite end of each with a screw 11, which engage threaded openings in the square members. By knowing the angle at which the structure is to be pitched and by adjusting the levels to correspond therewith the work of building may be carried on with assured accuracy.

By the manner of constructing and assembling the parts of this tool, as above set forth, it will be seen that provision is made for every contingency that will arise in the building of a structure of any character wherein the courses or parts thereof are to be laid on predetermined lines, so that a workman employing this tool, which will be small and compact in form, will be enabled to dispense with the cumbersome and heavy implements heretofore employed for the purposes herein named. Further, by reason of its peculiar construction the tool will not slide off of a slanting roof, as will inevitably result with the implements now in use by masons and bricklayers, whereby a saving of time is effected and danger of breakage or loss of tools is obviated.

Having thus fully described my invention, what I claim as new, and desire to secure by Letters Patent, is—

1. A tool of the character specified, comprising a square and a plumb, and adjustable spirit-levels carried by the square, adjacent to the plumb, and disposed at right angles to each other.

2. A tool of the character specified, comprising a square and a plumb, the square being provided on its under side with a jetting-gage.

3. A tool of the character specified, comprising a square and a plumb, the square being provided on its under side with adjustable jetting-gages.

4. A tool of the character specified, comprising a square each arm of which carries a spirit-level, a plumb or standard carried by the angle of the square, and a jetting-gage carried by the under side of each member of the square, the square and plumb being graduated to indicate, respectively, half and whole brick lengths including the mortar joint, and the height or thickness of courses.

In testimony that I claim the foregoing as my own I have hereto affixed my signature in the presence of two witnesses.

ALEXANDER M. BENNETT.

Witnesses:
E. S. BROWN,
CHESTER DENTON.